Sept. 19, 1950 A. T. HIGHT 2,523,212
VEHICLE BODY VIBRATOR
Filed March 12, 1948 3 Sheets-Sheet 1
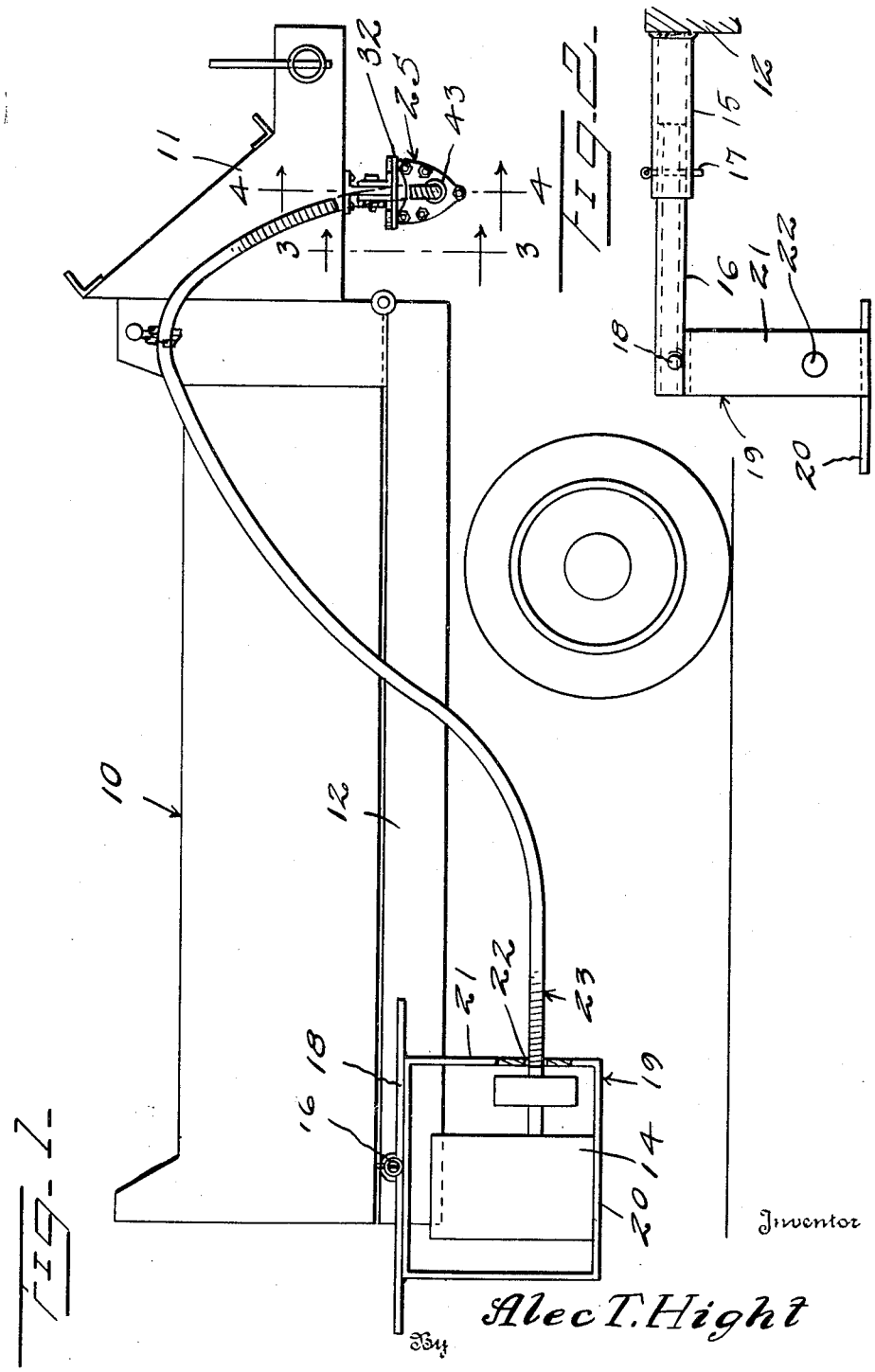
Inventor
Alec T. Hight
By Kimmel & Crowell Attorneys Sept. 19, 1950        A. T. HIGHT        2,523,212
VEHICLE BODY VIBRATOR
Filed March 12, 1948        3 Sheets-Sheet 2
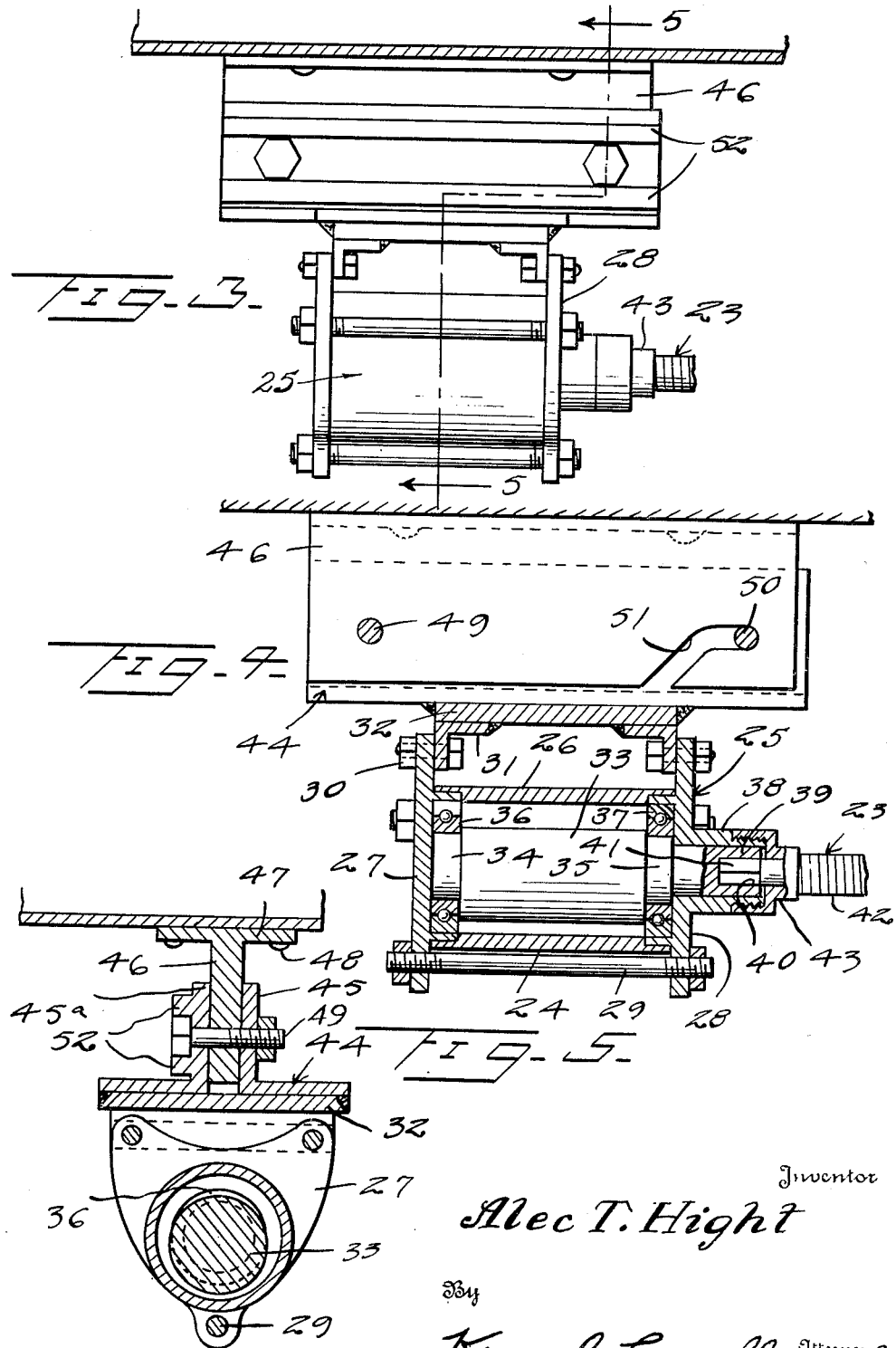
Inventor
Alec T. Hight
By
Kimmel & Crowell   Attorneys Sept. 19, 1950          A. T. HIGHT          2,523,212
VEHICLE BODY VIBRATOR
Filed March 12, 1948          3 Sheets-Sheet 3
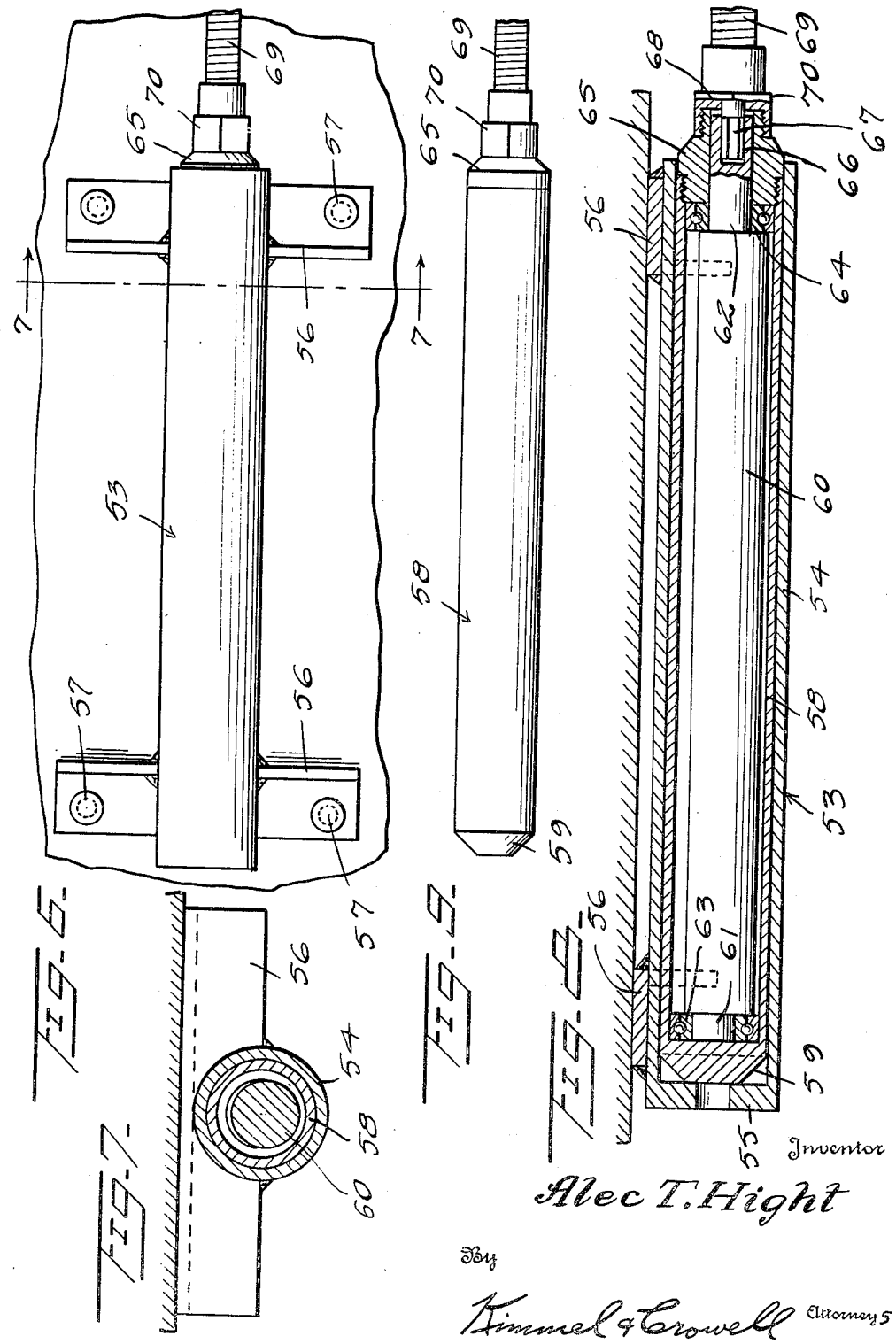
Inventor
Alec T. Hight
By
Kimmel & Crowell Attorneys Patented Sept. 19, 1950

2,523,212

UNITED STATES PATENT OFFICE 2,523,212

VEHICLE BODY VIBRATOR

Alec Turner Hight, Fayetteville, N. C.

Application March 12, 1948, Serial No. 14,512

3 Claims. (Cl. 298—1)

This invention relates to a vibrator attachment for material spreaders.

An object of this invention is to provide a vibrator structure which is constructed as a separate unit and adapted for mounting on a hopper or truck body so as to vibrate the body in order that the sand or other material in the body will be evenly and quickly discharged onto the ground or road.

Another object of this invention is to provide a pair of supports for mounting on a truck chassis and body one support for supporting a power member and the other for supporting the vibrator, so that each one of a series of trucks may be provided with the pair of supports, and the power member with the vibrator may be removably mounted on any one of the trucks or quickly transferred from one truck to another.

A further object of this invention is to provide a vibrator structure including a power member, a vibrator, a detachable mounting for the vibrator and a flexible shaft between the power member and the vibrator so that the latter may be mounted at a point closely adjacent the point of discharge of the material from the truck body.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detailed side elevation of a conventional truck body having mounted thereon a vibrator attachment constructed according to an embodiment of this invention.

Figure 2 is a detailed side elevation of the supporting means for the power member.

Figure 3 is a sectional view taken on the line 3—3 of Figure 1.

Figure 4 is a sectional view taken on the line 4—4 of Figure 1.

Figure 5 is a sectional view taken on the line 5—5 of Figure 3.

Figure 6 is a fragmentary bottom plan of a modified form of this invention.

Figure 7 is a sectional view taken substantially on the line 7—7 of Figure 6.

Figure 8 is a longitudinal section of the structure shown in Figures 6 and 7.

Figure 9 is a fragmentary side elevation of the vibrator unit removed from the tubular support or housing.

Referring to the drawings, and first to Figures 1 to 5 inclusive, the numeral 10 designates generally a conventional truck body which is formed at the rear thereof with a material discharging gate 11. In order to provide a means whereby the material in the truck body 10 may be evenly distributed or discharged at the time the forward end of the body 10 is raised relative to the chassis 12, I have provided a vibrator means which includes a power member 14 of conventional construction in the form of an internal combustion engine or the like. The power member 14 is supported from the forward end of the chassis 12 by means of a supporting structure or bracket which includes a tubular member 15 which is welded or otherwise firmly secured to the side of the chassis frame 12 and projects laterally therefrom. The tubular member 15 is adapted to have removably mounted therein a tubular member 16 which is secured in the tubular member 15, the latter constituting a socket by means of a removable securing pin 17. The tubular member 16 has fixed thereto and at right-angles to the length thereof an elongated rod 18 and a rectangular frame 19 is fixed at its upper end to the tubular member 16 and also to the rod 18.

The rectangular member 19 includes a bottom member or platform 20 on which the power member 14 may be firmly secured. One vertical side 21 of the frame 19 may be formed with an opening 22 through which an elongated flexible shaft 23 is adapted to be extended. The flexible shaft 23 is extended rearwardly to a position beneath the end gate structure 11 and is connected at its rear end to a vibrator member generally designated as 25.

The vibrator member 25 includes a housing 24 which is formed of a cylindrical body 26 having end plates or heads 27 and 28 secured thereto and held against the ends of the cylindrical body 26 by securing bolts 29. The end plates or heads 27 and 28 are secured by fastening members 30 to angle members 31 which are fixed to a base plate 32. The housing 24 has rotatably mounted therein an elongated eccentric member or weight 33 having aligned studs 34 and 35 at the opposite ends thereof which are journalled in anti-friction bearings 36 and 37 disposed within the cylindrical member 26. The stud 35 extends outwardly into a bushing 38 carried by the head plate 28 and the stud 35 which is formed with a reduced extension 39 is provided with a polygonal socket 40 within which the terminal end 41 of the flexible shaft is adapted to removably engage.

The flexible shaft or member 23 includes an outer sheath 42 having fixed to one end thereof a cap 43 which is adapted to be threaded onto the bushing 38. The base plate 32 has fixed to the upper side thereof a pair of lengthwise extending angle members 44 having parallel sides 45 which are spaced apart and between which a supporting bar or plate 46 is adapted to engage.

The bar or plate 46 includes an upper base plate 47 which may be secured by fastening members 48 or by welding to the bottom side of the end gate or truck structure. The angle members 44 are removably secured to the plate 46 by means of one bolt 49 engaging through the angle members 44 and the plate 46 and also by a second bolt 50 which engages in an obtusely inclined slot 51 which is formed in the plate 46 spaced from the bolt 49. The provision of the angled slot 51 facilitates the mounting of the vibrator structure 25 on the plate 46 as bolt 50 may be moved upwardly into the slot 51 and the vibrator structure then pivoted or swung upwardly until bolt 49 can be extended through the vertical sides of the angle members 44. Preferably, one of the angle members 45a is provided with longitudinally extending spaced parallel bars 52 between which the heads of the bolts 49 and 50 are adapted to engage so that these bolts will be firmly locked against rotation. It will be understood that the vibrator structure is under extreme vibration and without some extra provision being made the fastening members for the vibrator structure might readily break loose.

Referring now to Figures 6 to 9 inclusive, there is disclosed a modification of this invention which includes a vibrator housing 53 which is formed of a cylindrical body 54 open at one end and closed at the other end by means of an end wall 55. The housing 53 has secured thereto a pair of angle members or brackets 56 which are adapted to be secured as by fastening members 57 to the lower side of the truck body or end gate. The housing 53 has removably mounted therein an elongated tubular body 58 constituting the inner housing for the vibrator and the body 58 is provided at one end with an end wall 59.

An elongated eccentric weight member 60 is rotatably disposed within the body or housing 58 being formed with aligned studs 61 and 62 at the opposite ends thereof which are journalled in antifriction bearings 63 and 64, respectively. A cap or plug 65 is threaded into the inner end of the housing or member 58 and bears against the adjacent anti-friction bearing 64. The stud 62 extends through the plug or bushing 65 and is formed with a polygonal socket 66 within which the end 67 of the flexible vibrator shaft 68 is adapted to removably engage. The shaft 68 has disposed thereabout a flexible sheath 69 and a cap 70 is carried by the outer end of the sheath 69 and is threaded on the plug or bushing 65.

In the use and operation of this device where a series of trucks are owned by a company or the like, each truck may have mounted thereon a vibrator supporting member 46 at the rear of the truck and preferably adjacent the end gate structure as shown in Figure 1. Each truck will also have mounted on the chassis the power member supporting socket 15. The vibrator structure may be secured to or mounted on a selected truck, the supporting bar or tube 16 being inserted into the socket 15. The flexible shaft 23 may if desired, be supported between the ends thereof by a chain or other supporting member as indicated at 71 in Figure 1. The vibrator structure 25 is secured to the supporting plate 46 by extending the bolt 50 into the angle slot 51 and then raising the opposite end of the vibrator structure so that bolt 49 may be extended through the angle members 45 and 45a. When the eccentric or vibrator member 33 is rotated through the medium of the operation of the power member 14, the truck body 10, particularly at the rear thereof, will be vigorously vibrated so that the material such as sand or other fine material will be evenly discharged from the rear of the truck body. As one example, this device has been designed for attachment to trucks used in sanding roads either to discharge the sand onto the icy roads or to discharge the sand evenly onto the top of tarred or otherwise treated roads.

The structure shown in Figures 6 to 9 inclusive will operate in the same manner as that shown in Figures 1 to 5. An advantage of the structure shown in Figures 6 to 9 inclusive is that no tools are needed to mount the vibrator member 58 within the tubular housing 54. The vibrator member 58 may be frictionally held within the outer housing 54 or if desired, suitable means may be provided at the open end of the housing 54 to hold the inner vibrator member against the endwise movement.

I claim:

1. A vibrator attachment for a vehicle body comprising a power member, a supporting frame for said power member, a tubular member adapted to be fixedly secured in horizontally disposed position to said body, a second tubular member fixed to said frame and removably engaging in said first named tubular member, a vibrator housing, an eccentric rotatably mounted in said housing, a flexible driving connection between said eccentric and said power member, and disconnectible securing means for securing said housing to said body, said latter named means comprising a part fixed to the body, a second part fixed to said housing, and means detachably securing said parts together.

2. A vibrator attachment for a vehicle body comprising a power member, a supporting frame for said power member, a tubular member adapted to be fixedly secured in horizontally disposed position to said body, a second tubular member fixed to said frame and removably engaging in said first named tubular member, a vibrator housing, a flexible driving connection between said eccentric and said power member, and disconnectible securing means for securing said housing to said body, said latter named means comprising a T-shaped member having the head thereof secured to said body and the stem thereof disposed in depending relation, a pair of angle members fixed to said housing, and means detachably securing said angle members to said stem with the latter engaging between said angle members.

3. A vibrator attachment for a vehicle body comprising a power member, a supporting frame for said power member, a tubular member adapted to be fixedly secured in horizontally disposed position to said body, a second tubular member fixed to said frame and removably engaging in said first named tubular member, a vibrator housing, a flexible driving connection between said eccentric and said power member, and disconnectible securing means for securing said housing to said body, said latter named means comprising a T-shaped member having the head thereof secured to said body and the stem thereof disposed in depending relation, a pair of angle members fixed to said housing, said stem having an obtusely angled slot extending upwardly from the lower edge thereof, a bolt fixed between said angle members engaging in said slot, and a second bolt removably engaging through said angle members and said stem spaced from said first bolt.

ALEC TURNER HIGHT.

REFERENCES CITED

The following references are of record in the file of this patent:

UNITED STATES PATENTS

| Number | Name | Date |
| --- | --- | --- |
| 833,761 | Stevens | Oct. 23, 1906 |
| 1,587,612 | Staley | June 8, 1926 |
| 1,684,095 | Heaton | Sept. 11, 1928 |
| 2,054,253 | Horsch | Sept. 15, 1936 |
| 2,101,031 | Little | Dec. 7, 1937 |
| 2,154,208 | Jackson | Apr. 11, 1939 |